US012579065B2

(12) United States Patent
BenHanokh et al.

(10) Patent No.: US 12,579,065 B2
(45) Date of Patent: Mar. 17, 2026

(54) LIGHTWEIGHT KERNEL DRIVER FOR VIRTUALIZED STORAGE

(71) Applicant: Red Hat, Inc., Raleigh, NC (US)

(72) Inventors: Gabriel Zvi BenHanokh, Ra'anana (IL); Orit Wasserman, Ra'anana (IL); Uri Lublin, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 568 days.

(21) Appl. No.: 18/076,742

(22) Filed: Dec. 7, 2022

(65) Prior Publication Data

US 2024/0193081 A1 Jun. 13, 2024

(51) Int. Cl.
*G06F 12/08* (2016.01)
*G06F 3/06* (2006.01)
*G06F 13/16* (2006.01)

(52) U.S. Cl.
CPC .............. *G06F 12/08* (2013.01); *G06F 3/061* (2013.01); *G06F 3/0635* (2013.01); *G06F 3/067* (2013.01); *G06F 13/1668* (2013.01); *G06F 2212/657* (2013.01)

(58) Field of Classification Search
CPC ........ G06F 12/08; G06F 3/061; G06F 3/0635; G06F 3/067; G06F 13/1668; G06F 2212/657
See application file for complete search history.

(56) References Cited

U.S. PATENT DOCUMENTS 8,996,807 B2 3/2015 Joshi et al.
9,558,111 B1 1/2017 Balcha et al.

9,959,214 B1* 5/2018 Habusha ............. G06F 12/1027
10,101,935 B2 10/2018 Malladi et al.
10,216,455 B1* 2/2019 Schroeder ............... G06F 3/067
10,365,938 B2 7/2019 Joshi et al.
10,678,432 B1 6/2020 Dreier et al.
2007/0174850 A1* 7/2007 El Zur .................. G06F 13/385
719/321
2008/0244087 A1* 10/2008 Pope ..................... H04L 45/021
709/238

FOREIGN PATENT DOCUMENTS

CN 113242175 A 8/2021

OTHER PUBLICATIONS

Tholeti, B.; "Dive into the KVM Hypervisor" IBM Developer, Published Sep. 22, 2011 (8 pages) https://developer.ibm.com/articles/cl-hypervisioncompare-kbm/.
Di Torino, P.; "The Evolution of the Network Architecture from Hardware Defined Network to Software Defined Network and Network Function Virtualization," Master's Degree Thesis; (2021-2022) 35 pages. https://webthesis.biblio.polito.it/secure/24607/1/tesi.pdf.

* cited by examiner

*Primary Examiner* — Jorge A Chu Joy-Davila
(74) *Attorney, Agent, or Firm* — Womble Bond Dickinson (US) LLP

(57) ABSTRACT

A routing table is requested from a storage device operatively coupled to the computing device, the routing table comprising a routing table entry mapping a virtual storage address to a destination storage address of the storage device. An input/output (I/O) request is received from an application executing on the computing device, the I/O request comprising the virtual storage address. A modified I/O request is transmitted to the storage device based on the mapping of the routing table entry.

20 Claims, 5 Drawing Sheets

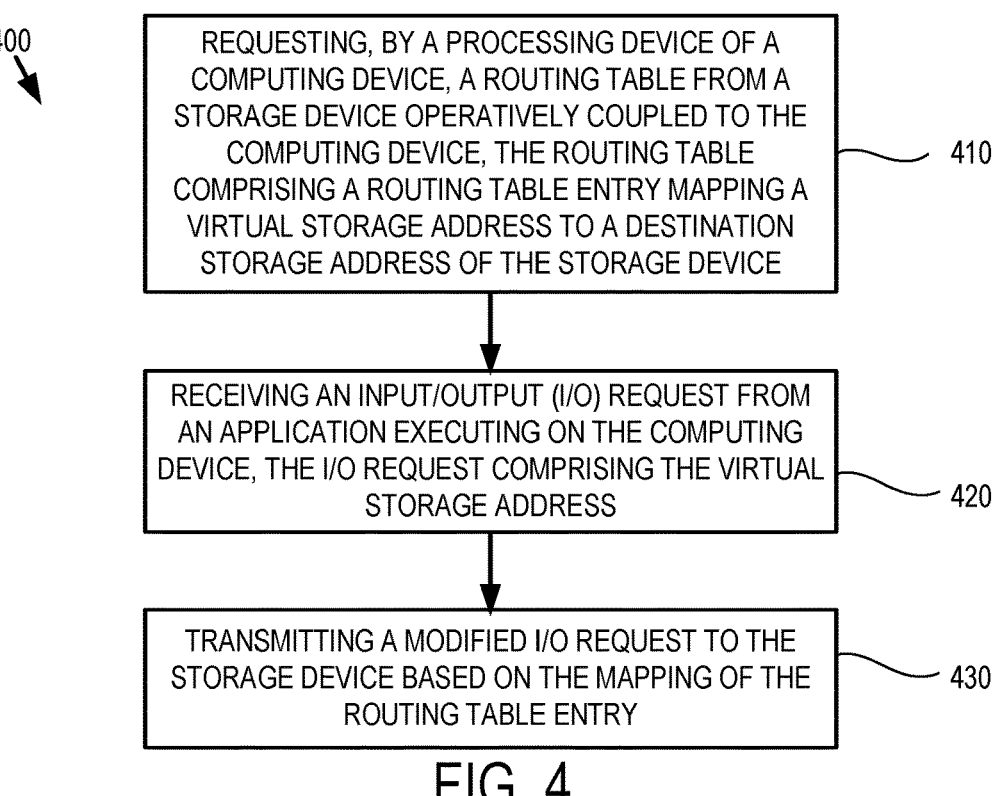

400

REQUESTING, BY A PROCESSING DEVICE OF A COMPUTING DEVICE, A ROUTING TABLE FROM A STORAGE DEVICE OPERATIVELY COUPLED TO THE COMPUTING DEVICE, THE ROUTING TABLE COMPRISING A ROUTING TABLE ENTRY MAPPING A VIRTUAL STORAGE ADDRESS TO A DESTINATION STORAGE ADDRESS OF THE STORAGE DEVICE — 410

RECEIVING AN INPUT/OUTPUT (I/O) REQUEST FROM AN APPLICATION EXECUTING ON THE COMPUTING DEVICE, THE I/O REQUEST COMPRISING THE VIRTUAL STORAGE ADDRESS — 420

TRANSMITTING A MODIFIED I/O REQUEST TO THE STORAGE DEVICE BASED ON THE MAPPING OF THE ROUTING TABLE ENTRY — 430

FIG. 4

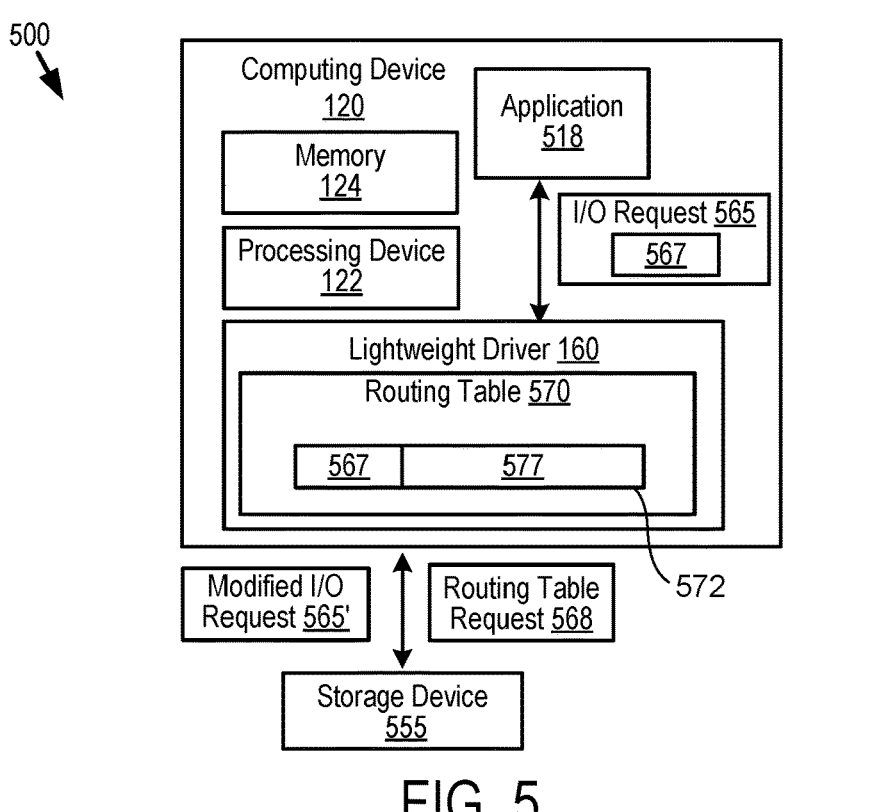

LIGHTWEIGHT KERNEL DRIVER FOR VIRTUALIZED STORAGE

TECHNICAL FIELD

Aspects of the present disclosure relate to storage platforms, and more particularly, to storage platforms incorporating virtualization and sharding storage schemes.

BACKGROUND

Large scale, cloud-based storage systems can be used to store large data objects. A storage system can include many nodes, and each node can include one or more storage devices and computing hardware to manage reading from and writing to the storage devices. Because large data objects can be gigabytes in size, and a typical storage system can store billions of objects, many node storage devices include hardware that can handle large amounts of data.

Large-scale storage systems may include one or more entities that perform storage virtualization and/or data sharding for the system. Storage virtualization allows for a storage system to contain multiple physical devices that are maintained as a virtual device that is presented to clients. The storage system may utilize complex techniques to allocate storage requests (e.g., reads and writes) to the appropriate physical storage device. Data sharding is a partitioning strategy that divides large data objects into smaller parts that are shards, and that stores the shards in different physical nodes of the storage system. Nodes can also store metadata that describes the data object and how the data object is stored. This meta data may be used to route a particular storage request to the correct physical device for storage.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

FIG. 4 is a flow diagram of a method for operating a lightweight driver, in accordance with some embodiments of the present disclosure.

FIG. 5 is a schematic block diagram illustrating an example embodiment of a computer system for operating a lightweight driver, in accordance with some embodiments of the present disclosure.

DETAILED DESCRIPTION

Figure 1:
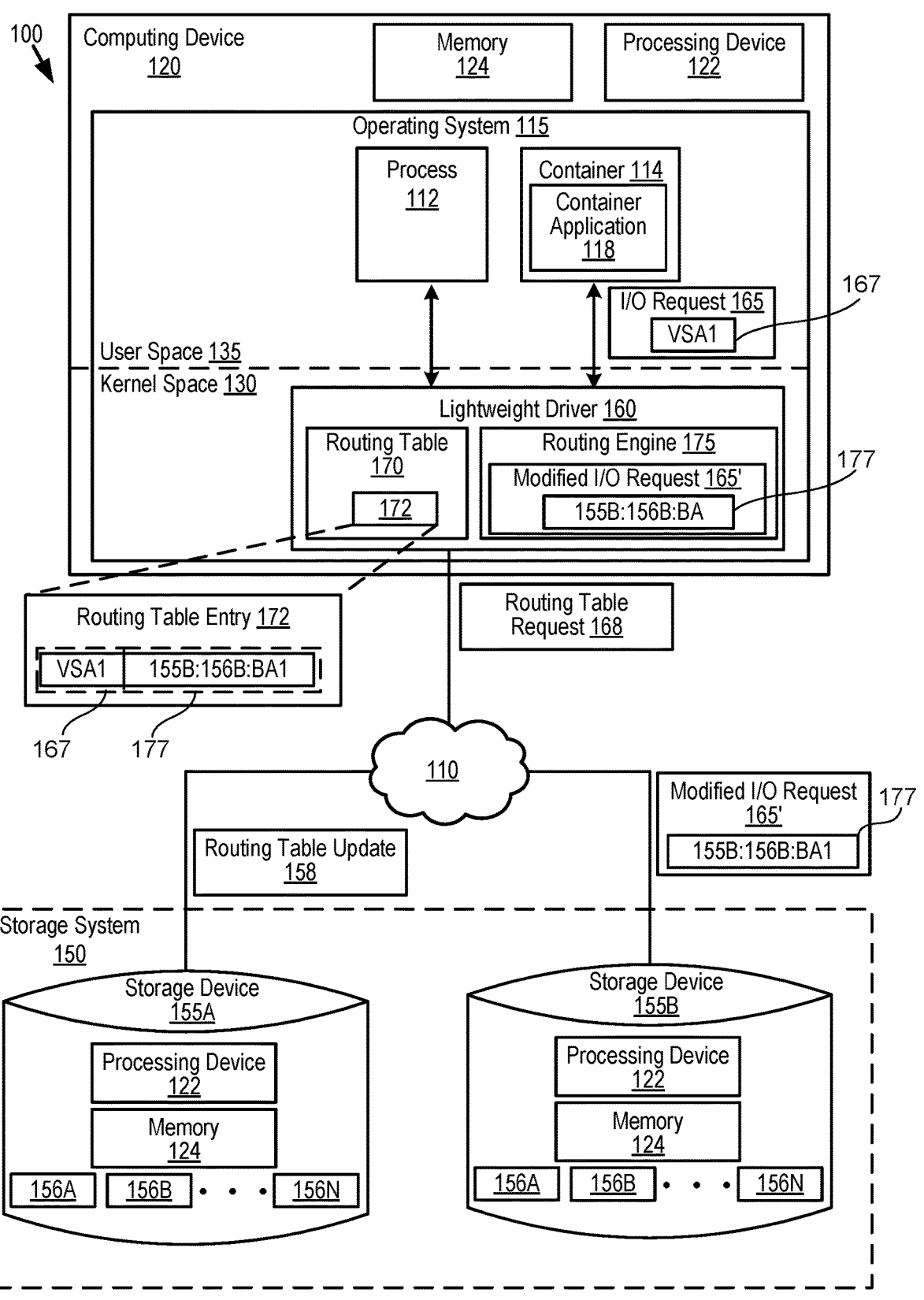
FIG. 1 is a block diagram that illustrates an example system, in accordance with some embodiments of the present disclosure.

Modern computer systems may incorporate a number of complex strategies to provide an appropriate level of storage space and responsiveness to clients. Among other techniques, virtualized storage systems and data sharding allow for complex storage systems to be utilized that include routing strategies that may route storage requests to one or more different physical devices. Thus, a storage request from a client may include a particular block of a device, and the storage system may route the block to a modified destination, which may include a different block on one or more separate storage devices.

In some cases, this routing may be performed by a gateway device. For example, the storage system (or another device) may take as input the request from the client and may route that request to the correct destination device/location. The gateway device may collect the response from the destination device/location and provide the response to the client device. This gateway approach, however, is inefficient. It adds an extra communication to each storage request, which may impact the performance of the storage request.

To avoid and/or reduce a performance impact, the storage routing could, instead, be fully performed by the operating system of the client. Such sophisticated storage systems may be more difficult to implement in a kernel of an operating system For example, the algorithms to route the storage requests to the right device may be complex, and may include updates to the operating system and/or the drivers associated with the storage system whenever the underlying technology (e.g., sharding/virtualization) are modified.

To avoid kernel updates, a possible solution is to include the more sophisticated parts of the storage scheme in a user space of the operating system, where updates may be made without affecting the kernel of the operating system. However, including the routing determination in the user space of the operating system may be less efficient than performing those determinations in the kernel space, as the user space may perform multiple expensive context switches (between the user space and the kernel space) on every I/O operation to perform the route determination.

In addition, such a user-space-based solution may cause issues when utilized with container solutions. Containers are active components executing on an operating system that provide an environment for applications to run, while being isolated from any other components of a host machine, network, or data center etc. Multiple containers may execute on a single operating system kernel and share the resources of the hardware on which the operating system is running. All of the files, libraries and dependencies necessary to run applications in a container may be provided by an image file(s). An image file may be comprised of a set of base layers that define the runtime environment, as well as the packages and utilities necessary for a containerized application to run. Containers may be unable to access user-mode libraries or binaries on a system that are outside the container image. Such containers may need to have all of the user binaries included or may need to rely on kernel drivers providing block device interface. Therefore, the use of user binaries and/or libraries to implement a storage scheme may require that the user binaries and/or libraries be included in every container that wishes to access the storage. This may cause a similar upgrade issues, where each container including such software must be updated whenever the storage algorithm is changed.

The present disclosure addresses the above-noted and other deficiencies by utilizing a lightweight kernel driver providing a block-device application programming interface (API) to storage clients. The lightweight kernel driver may route all requests to the correct target device using a routing table determined from the storage devices. As used herein, a "lightweight" driver refers to an operating system driver that utilizes a reduced set of code instructions as compared to a fully-featured driver. For example, the lightweight kernel driver may not maintain the full logic to route a storage request to the appropriate storage destination. Instead, the lightweight kernel driver (also referred to herein as "lightweight driver") may include code instructions that request the routing from the storage device, and maintain a routing table that may be utilized to service storage requests.

For example, target storage devices may keep an online routing table to map the target of incoming I/O requests. The kernel driver may maintain a copy of the routing table, loaded from a target storage device, showing the destination for I/O requests. On system startup, the kernel driver may have an empty copy of the routing table and may load the routing table from a connected target storage device. For example, the kernel driver may send a direct request to the target storage device or, as will be described further herein, may send an I/O request to a target storage device and update the routing table based on a return response from the target storage device.

The routing table may become stale when configuration changes happen (e.g., failover, fallback, growth, shrinkage, etc., within the storage system) leading to I/O landing on the wrong target storage device. When a target storage device receives an I/O request for data it does not manage, it may send back a notification to the requesting machine indicating that the routing table should be updated. In response, the kernel driver may send a routing table read request to the target storage device and may build/update its routing table with the information received in response to the request. When an I/O request is sent to a target storage device that does not exist (e.g., was removed by a configuration change), the I/O request may fail with an appropriate error and the kernel driver may load a copy of the updated routing table from a different target storage device and send the I/O request to the new storage destination.

Embodiments of the present disclosure may improve the technology associated with storage devices of a computing device, thus improving the computing device.

Embodiments of the present disclosure may provide improved performance as compared to gateway devices, reducing the number of transmissions that are made to complete a storage transaction. Moreover, the use of the kernel driver may allow for software environments such as containers to avoid including complex storage routing algorithms within the container infrastructure. Though implemented as a kernel driver, embodiments of the present disclosure may nonetheless reduce the number of kernel updates as a result of changed storage algorithms. A change to a storage algorithm may result in a difference in how a routing table is generated, but the change may not impact the kernel driver, since the kernel driver is simply requesting the generated routing table from the storage system. In this way, changes to the storage system routing algorithms may have little, if any, impact on the kernel driver itself, reducing an impact to the operating system.

FIG. 1 is a block diagram that illustrates an example system 100, in accordance with some embodiments of the present disclosure. As illustrated in FIG. 1, the system 100 includes computing device 120 and a storage system 150 containing storage devices 155. The number of storage devices 155 in FIG. 1 is merely an example, and is not intended to limit embodiments of the present disclosure.

FIG. 1 illustrates the storage system 150 with a first storage device 155A and a second storage device 155B as an example configuration. FIG. 1 and the other figures may use like reference numerals to identify like elements. A letter after a reference numeral, such as "155A," indicates that the text refers specifically to the element having that particular reference numeral. A reference numeral in the text without a following letter, such as "155," refers to any or all of the elements in the figures bearing that reference numeral.

The computing device 120 (and storage devices 155) may include hardware such as processing device 122 (e.g., processors, central processing units (CPUs)) and memory 124 (e.g., random access memory (RAM), hard-disk drive (HDD), and other hardware devices (e.g., network interfaces, sound card, video card, etc.).

The storage devices 155 and the computing device 120 may be coupled to each other (e.g., may be operatively coupled, communicatively coupled, may communicate data/messages with each other) via network 110. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI™ hotspot connected with the network 110 and/or a wireless carrier system that can be implemented using various data processing equipment, communication towers (e.g. cell towers), etc. The network 110 may carry communications (e.g., data, message, packets, frames, etc.) between storage devices 155 and/or the computing device 120. As used herein, the term "and/or" includes any and all combinations of one or more of the associated listed items.

The computing device 120 may comprise any suitable type of computing device or machine that has a programmable processor including, for example, server computers, desktop computers, laptop computers, tablet computers, smartphones, set-top boxes, etc. In some examples, the computing device 120 may respectively comprise a single machine or may include multiple interconnected machines (e.g., multiple servers configured in a cluster). The storage devices 155 and/or the computing device 120 may be implemented by a common entity/organization or may be implemented by different entities/organizations. For example, computing device 120 may be operated by a first company/corporation and the storage devices 155 may be operated by a second company/corporation. The storage devices 155 and/or the computing device 120 may each execute or include an operating system (OS).

Though illustrated as a single element, storage device 155 may be or include a distributed storage network. In some embodiments, the storage device 155 may be or include a plurality and/or cluster of storage hardware, each including a server and a corresponding storage medium. In some embodiments, the storage device 155 may implement object storage on a single distributed computer cluster and provide integrated interfaces for at least one of: object-level, block-level, or file-level storage.

The storage devices 155 of the storage system 150 may each include a plurality of block devices 156. For example, the first storage device 155A and the second storage device 155B are each illustrated as including block devices 156A, 156B, to 156N, as an example only. In FIG. 1, block devices 156A to 156N are shown, but these are merely examples and are not intended to limit the embodiments of the present disclosure. The block devices 156 may represent low-level storage elements of the storage device 155. In some embodiments, the data of the storage device 155 may be stored within the block devices 156. In some embodiments, the data of the block devices 156 may be further broken down in smaller portions or chunks (e.g., blocks) for storage in the storage device 155.

The computing device 120 may include an operating system 115. The operating system 115 of the computing device 120 may manage the execution of other components (e.g., software, applications, etc.) and/or may manage access to the hardware (e.g., processors, memory, storage devices etc.) of the computing device 120. Operating system 115 may include a kernel space 130 and a user space 135 supporting the execution of one or more applications. For example, in FIG. 1, the user space 135 is illustrated with two applications: an executing process 112 and an executing container application 118 of container 114. Though two applications are illustrated in FIG. 1, it will be understood that a plurality of applications may be present. Operating system kernel space 130 may include several operating system functionalities, including but not limited to process management, hardware interfaces, access control and the like. Functions executing within the kernel space 130 may execute with an elevated privilege and may manage the administration of the operating system 115. Examples of operating systems 115 include WINDOWS™, LINUX™, ANDROID™, IOS™, and MACOS™. In some embodiments, the operating system 115 may be, or be part of, a virtual machine executing on the computing device 120.

As illustrated in FIG. 1, computing device 120 may run a container 114 (also referred to herein as a "container image"). The container 114 may include a container application 118 (also referred to herein as application 118). Container application 118 may be a desktop application, a network application, a database application, or any other application that may execute within the container 114. The operating system 115 may allow different containers 114 to share access to the resources of the operating system 115 (e.g., the kernel space 130, packages, binaries, libraries etc.), and may also perform other functions as discussed in more detail herein. The container 114 may be isolated, in that it is not connected to any other process 112 of computing device 120, whether virtual or otherwise.

The kernel space 130 may enable access to the storage system 150 for the process 112 and/or the container application 118. For example, the process 112 and/or the container application 118 may transmit an input/output (I/O) request 165 directed to the storage system 150 to access data stored therein. Though FIG. 1 illustrates that the I/O request 165 is from the application 118 of the container 114, this is for ease of discussion only. In some embodiments, the I/O request 165 may be made by the process 112 (e.g., a non-container application) without deviating from the embodiments of the present disclosure. Thus, the I/O request 165 may come from a containerized application 118 executing within a container 114 in the user space 135 of the operating system 115 and/or from a process 112 executing in the user space 135 of the operating system 115.

In some embodiments, the I/O request 165 may include a destination for the I/O request 165. The destination may include, for example, a virtual storage address 167 of the I/O request 165. The virtual storage address 167 may include, for example, a location of a block (e.g., a logical block address) to which data is to be stored and/or from which data is to be read. The virtual storage address 167 may correspond to a block of a block device 156, but the virtual storage address 167 may not be a direct address (e.g., a physical address) of a block of a block device 156. Stated another way, the application 118 may be unaware of the physical layout of the block devices 156 of the storage devices 155. Instead, the application 118 may utilize virtual storage addresses 167, which may be further analyzed to determine an actual physical address that corresponds to the virtual storage address 167.

In some embodiments, the storage system 150 may be configured to hide the low-level details of the block devices 156 of the storage device 155 from the application 118 of the computing device 120. For example, the storage system 150 may route input/output (I/O) requests 165 to the storage system 150 to block devices 156 of the storage device 155 based on one or more algorithms to increase a speed of access to the storage system 150. For example, the storage system 150 may be configured to distribute data of the storage system 150 across a plurality of storage devices 155 transparently to the application 118 of the computing device 120. Despite the use of a plurality of storage devices 155, the application 118 of the computing device 120 may see a single storage entity accessible via a virtual storage address 167, and the virtual storage address 167 may be routed to the correct storage device 155. As another example, the storage system 150 may be configured to distribute a particular data object as shards across the plurality of storage devices 155. In such a scenario, a sequential read through a data file by the application 118 (e.g., utilizing a virtual storage address 167) may instead be transformed into accesses of a plurality of block devices 156 on a plurality of storage devices 155.

In the presence of various potential storage algorithms, the I/O request 165 may be routed to the correct block device 156 and/or storage device 155. In some traditional systems, the routing may be determined by a kernel driver or by a device on the storage system 150 itself. However, as described herein, the use of a kernel driver to perform the algorithm to determine the routing may lead to administrative complications when an algorithm is to be changed. In addition, utilizing a gateway function within the storage system 150 for every I/O request 165 may result in performance penalties for every I/O request 165 to the storage system 150. For example, with a gateway structure, every I/O request 165 would first be sent to the gateway device, and would then be forwarded on to the correct storage device 155 and/or block device 156, increasing the number of transmissions needed to fulfill the I/O request 165.

Embodiments of the present disclosure may improve the performance of the I/O request 165 by maintaining a lightweight kernel driver 160. The lightweight kernel driver 160 may be configured to generate a modified I/O request 165' from an I/O request 165 based on a routing table 170. For example, a routing engine 175 of the lightweight driver 160 may be configured to receive the I/O request 165 from an application 118 of the computing device 120. For example, the lightweight driver 160 may be configured to execute in the kernel space 130 of the operating system 115, while the application 118 may be configured to transmit the I/O request 165 from the user space 135 of the operating system 115. In some embodiments, the lightweight driver 160 may execute within a hypervisor of a computing device 120 supporting the execution of virtual machines. In such an environment, the hypervisor may be interpreted as the operating system 115 illustrated in FIG. 1.

The lightweight driver 160 may maintain the routing table 170. The routing table 170 may include one or more routing table entries 172 allowing for the mapping of a virtual storage address 167 of the I/O request 165 to a destination storage address 177 of the modified I/O request 165'. For example, the routing table 170 may contain a mapping between a virtual storage address 167 of the I/O request 165 to a destination storage address 177 of a block device 156 of a storage device 155 of the storage system 150. By using the routing table 170, the lightweight driver 160 may be able to transmit the modified I/O request 165' directly to the correct storage device 155 and/or block device 156. The routing engine 175 may be configured to route the I/O request 165 received from the application 118 (e.g., a client in user space 135) to the associated block device 156 without the use of a gateway device or complicated algorithms within the kernel space 130.

Referring to FIG. 1, an example routing table entry 172 is illustrated. It will be understood that the routing table entry 172 is merely an example, and the contents and format of the routing table entry 172 may be different from that illustrated in FIG. 1 in some embodiments. The routing table entry 172 may be one of a plurality of routing table entries 172 within the routing table 170. As illustrated in FIG. 1, the routing table entry 172 may describe a mapping relationship between a virtual storage address 167 and a destination storage address 177. The routing table 170 may allow the lightweight driver 160, given a particular virtual storage address 167, to determine the corresponding destination storage address 177, which may then be used to construct the modified I/O request 165'. In some embodiments, the routing table 170 may be a lookup table, but the embodiments of the present disclosure are not limited to such a configuration.

Though FIG. 1 illustrates that the routing table entry 172 maps a particular virtual storage address 167 to a particular destination storage address 177, this is merely for the purposes of explanation. In some embodiments, the routing table entry 172 may map blocks (e.g., 1 GB of data) of virtual storage addresses 167 to corresponding blocks of destination storage addresses 177. In some embodiments, the routing table entry 172 may map by hash families, such at all objects and/or virtual storage addresses 167 with the same hash may be routed to a same destination storage address 177. Thus, embodiments according to the present disclosure may support the routing table entry 172 mapping the virtual storage address 167 to the destination storage address 177 of a storage device 155 in embodiments beyond a strict one-to-one mapping scenario.

In the example of FIG. 1, an example I/O request 165 is shown containing a virtual storage address 167 identified as "VSA1". Upon receipt of the I/O request 165, the lightweight driver 170 may consult the routing table 170. The routing table 170 may include a routing table entry 172 that maps the virtual storage address 167 of "VSA1" to a destination storage address 177 of "155B:156B:BA1." The routing entry 172 may indicate that the virtual storage address 167 of "VSA1" is associated with a particular block address "BA1" of a particular block device 156B of a particular storage device 155B. As noted above, the format of the destination storage address 177 illustrated in FIG. 1 is merely an example for purposes of explanation. In some embodiments, the destination storage address 177 may be an address of a particular storage device 155. In such an embodiment, the storage device 155 may be responsible for identifying the final physical location for the virtual storage request 167 of the I/O request 165. Utilizing the destination storage address 177, the lightweight driver 160 may construct the modified I/O request 165' and transmit the modified I/O request 165' to the destination storage address 177.

In some embodiments, the lightweight driver 160 may be configured to maintain the routing table 170 by requesting updates to the routing table 170 directly from the storage system 150 and/or the storage devices 155. By requesting the routing table 170, or portions of the routing table 170, from the storage system 150, the lightweight driver 160 may avoid having to understand and/or implement the routing schemes of the storage system 150. The storage devices 155 themselves can determine the correct routing information, and provide that routing information to the lightweight driver 160 for use in the routing table 170. The routing table 170 can then be used by the routing engine 175 of the lightweight driver 160 to map the I/O request 165 to the modified I/O request 165' for transmission to a destination storage address 177 of a storage device 155.

In some embodiments, the storage devices 155 and/or storage system 150 may be configured to provide a routing table update 158 to the lightweight driver 160. The routing table update 158 may contain additional and/or replacement routing table entries 172. Upon receipt of the routing table update 158, the lightweight driver 160 may update the routing table 170 based on the routing table update 158. For example, if the routing table update 158 contains new routing table entries 172, they may be added to the routing table 170. If the routing table update 158 includes modified routing table entries 172, the routing table entries 172 of the routing table 170 may be replaced by the routing table entries 172 of the routing table update 158. In some embodiments, the routing table update 158 may indicate routing table entries 172 that are to be removed from the routing table 170.

In some embodiments, the routing table update 158 may be transmitted to the lightweight driver 160 in response to an update in the storage mappings of the storage system 150. For example, if a storage device 155 removed from the storage system 150, the data assigned to that storage device may be reallocated to other storage devices 155 of the storage system 150, and routing table entries 172 that previously mapped to the removed storage device 155 may be updated (e.g., by a routing table update 158) to map to a different storage device 155. As another example, if a storage device 155 is added to the storage system 150, routing table entries 172 that previously mapped to other storage devices 155 of the storage system 150 may be updated (e.g., by a routing table update 158) to map to the newly-added storage device 155.

Though the routing table update 158 may be initiated by the storage system 150, the embodiments of the present disclosure are not limited to such a configuration. In some embodiments, the routing table update 158 may be provided in response to a routing table request 168 from the lightweight driver 160. In some embodiments, each of the storage devices 155 may be configured to provide a routing table update 158 for all of the storage devices 155 of a storage system 150. For example, the lightweight driver 160 may be able to transmit a routing table request 168 to a first storage device 155A (e.g., over network 110) and receive a routing table update 158 that include routing table entries 172 for both the first storage device 155A and the second storage device 155B of the storage system 150. In this way, the lightweight driver 160 may be configured to generate a routing table 170 (or an update to the routing table 170) for the entire storage system 150 through a request to a single storage device 155.

In some embodiments, an initial routing table 170 may be requested of the storage system 150 at the booting of the operating system 115, and may be maintained during the operation of the computing device 120. For example, when the operating system 115 boots, it may discover the storage system 150 being connected to the computing device 120. The operating system 115 may conduct an inventory of the storage devices 155 of the storage system 150, and may transmit a routing table request 168 to the storage system 150 and/or one or more of the storage devices 155. In response to the routing table request 168, the lightweight driver 160 may receive the routing table update 158, and may construct the routing table 170 therefrom.

Figure 2:
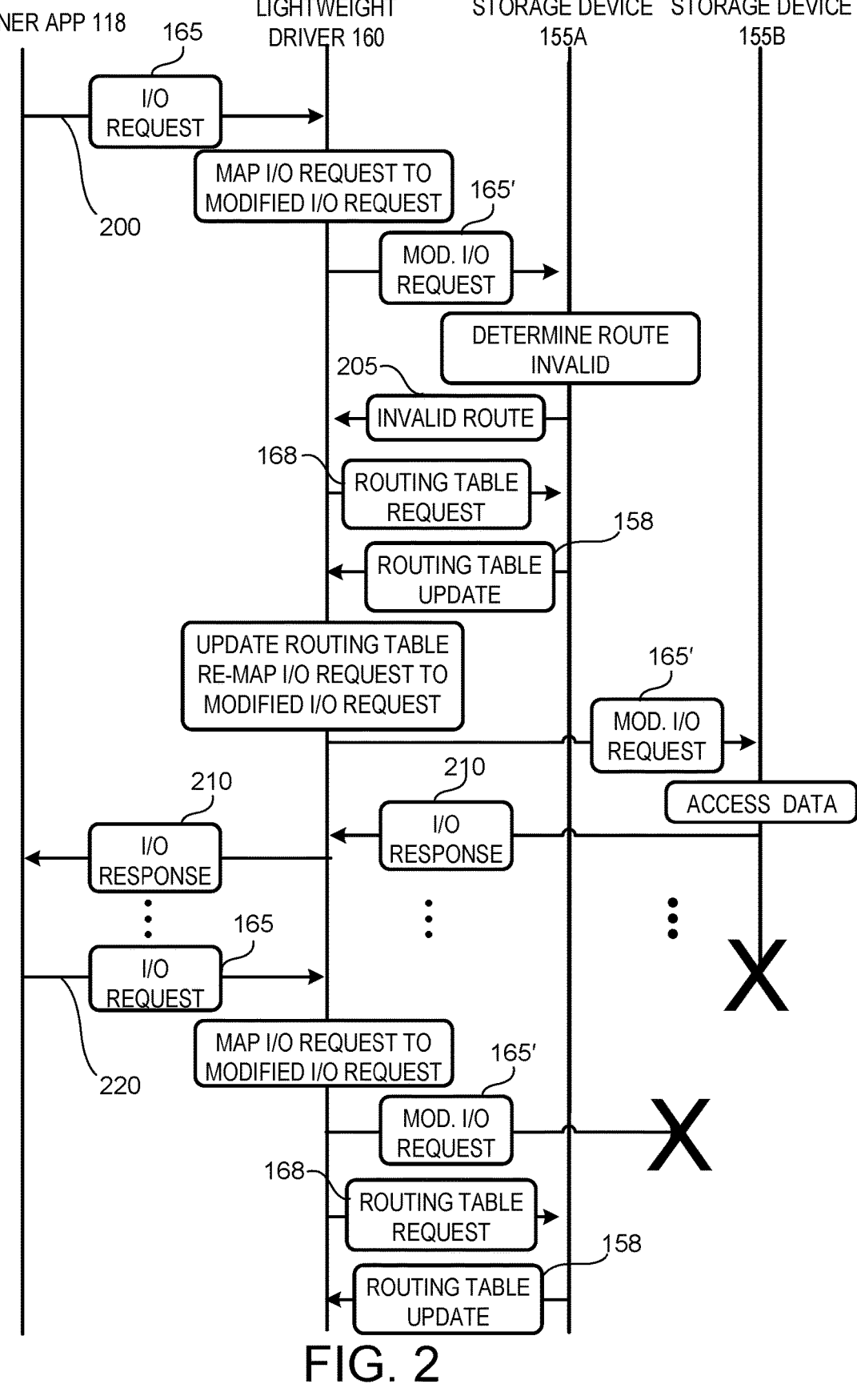
FIG. 2 is a schematic diagram of a process flow illustrating communications to maintain a routing table, in accordance with some embodiments of the present disclosure.

In some embodiments, the lightweight driver 160 may be configured to maintain the routing table 170 based on communications with the storage devices 155. FIG. 2 is a schematic diagram of a process flow illustrating communications to maintain a routing table 170, in accordance with some embodiments of the present disclosure. A description of elements of FIG. 2 that have been described with respect to FIG. 1 will be omitted for brevity.

Referring to FIGS. 1 and 2, an example is shown in which a container application 118 transmits an I/O request 165 to the lightweight driver 160 at operation 200. In response to the I/O request 165, the lightweight driver 160 may map a virtual storage address 167 of the I/O request 165 to a destination storage address 177 using the routing table 170 and create a modified I/O request 165', as described herein with respect to FIG. 1. The modified I/O request 165' may be transmitted to a first storage device 155A, which may be a storage device 155 identified by the destination storage address 177.

In response to the modified I/O request 165', the first storage device 155A may determine that the mapping and/or routing of the modified I/O request 165' may be incorrect. For example, the destination storage address 177 of the modified I/O request 165' may refer to a storage location that is no longer managed and/or maintained by the first storage device 155A. Such a situation can happen, for example, if the storage system 150 has reallocated data from the first storage device 155A to a second storage device 155B. In response to the invalid modified I/O request 165', the first storage device 155A may return a transmission 205 to the lightweight driver 160 indicating an invalid routing.

In response to the transmission 205 indicating the invalid routing, the lightweight driver 160 may transmit a routing table request 168 to the first storage device 155A. In response to the routing table request 168, the first storage device 155A may return a routing table update 158 to the lightweight driver 160. The routing table update 158 may allow the lightweight driver 160 to update/correct its routing table 170. Though FIG. 2 illustrates that the first storage device 155A transmits the routing table update 158 after the routing table request 168 from the lightweight driver 160, this is only an example, and the embodiments of the present disclosure are not limited to this configuration. In some embodiments, the first storage device 155A may include the routing table update 158 as part of the transmission 205 indicating the invalid route.

After receiving the routing table update 158, the lightweight driver 160 may update the routing table 170 based on the routing table update 158, and re-map the I/O request 165 from the container application 118 utilizing the update routing table 170 to create a second modified I/O request 165'. For example, as a result of the routing table update 158, it may be indicated that the virtual storage address 167 of the I/O request 165 is routed to a destination storage address 177 that corresponds to the second storage device 155B. The lightweight driver 160 may transmit the second modified I/O request 165' to the second storage driver 155B based on the updated routing table 170. In response to the second modified I/O request 165' the second storage device 155B may access the data (e.g., perform a read and/or a write of the data associated with the destination storage address 177) on a block device 156 of the second storage device 155B, and may provide an I/O response 210 to the lightweight driver 160 in response to the second modified I/O request 165'. The lightweight driver 160 may further provide the I/O response 210 to the container application 118.

The example of FIG. 2 also provides an illustration of a scenario in which one of the storage devices 155 is removed and/or fails. For example, in operation 220, the container application 118 may transmit an I/O request 165 to the lightweight driver 160. In response to the I/O request 165, the lightweight driver 160 may map a virtual storage address 167 of the I/O request 165 to a destination storage address 177 and create a modified I/O request 165', as described herein with respect to FIG. 1. The modified I/O request 165' may be transmitted to the second storage device 155B, which may be a storage device 155 identified by the destination storage address 177 from the routing table 170.

However, the second storage device 155B may fail to respond to the modified I/O request 165'. For example, the response to the modified I/O request 165' may exceed a defined duration (e.g., may time out). As a result of the lack of response to the modified I/O request 165', the lightweight driver may determine that its routing table 170 is inaccurate, and the lightweight driver 160 may transmit a routing table request 168 to the first storage device 155A (or any other storage device 155 of the storage system 150).

In response to the routing table request 168, the first storage device 155A may return a routing table update 158 to the lightweight driver 160. The routing table update 158 may allow the lightweight driver 160 to update/correct its routing table 170.

After receiving the routing table update 158, the lightweight driver 160 may update the routing table 170 based on the routing table update 158, and re-map the I/O request 165 from the container application 118 utilizing the update routing table 170 to create another modified I/O request 165' as previously described. In this way, the lightweight driver 160 may be able to maintain its routing table 170 even if storage devices 155 are removed to which it has current routing table entries 172 in the routing table 170.

Though FIG. 2 illustrates that the lightweight driver 160 determines that the second storage device 155B is unavailable through the time-out of a modified I/O request 165', the embodiments of the present disclosure are not limited to this configuration. In some embodiments, the lightweight driver 160 may monitor the status of storage devices 155 to which the lightweight driver 160 is connected, and may automatically detect the removal and/or failure of a storage device 155. In such a scenario, the lightweight driver may proactively request a routing table 170 update (e.g., utilize a routing table request 168, as described herein).

Figure 3:
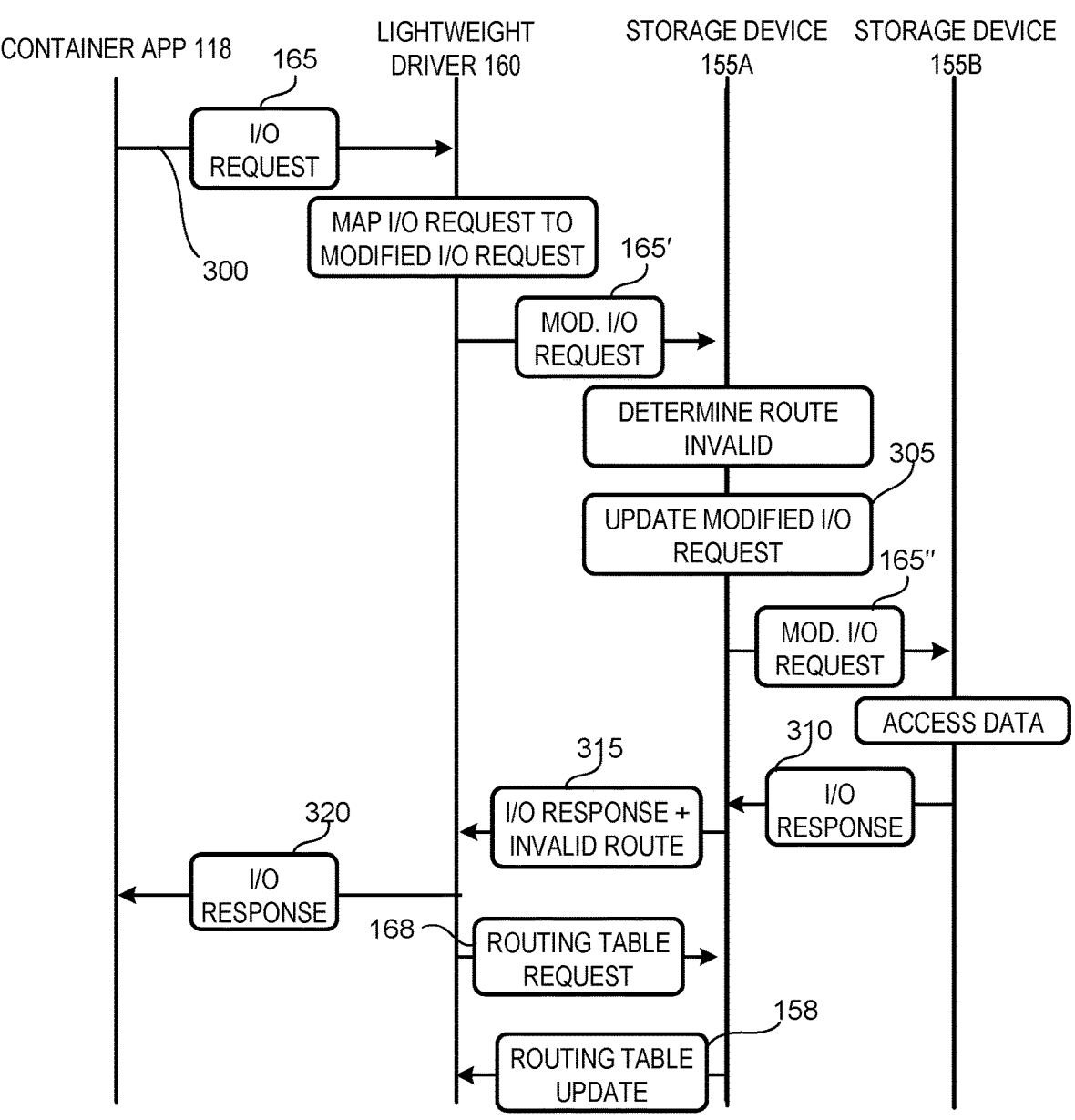
FIG. 3 is a schematic diagram of a process flow illustrating communications to manage an invalid routing entry, in accordance with some embodiments of the present disclosure.

In addition, though FIG. 2 illustrates that the lightweight driver 160 retransmits the modified I/O request 165' in response to an incorrect routing in the routing table 170, the embodiments of the present disclosure are not limited to this configuration. FIG. 3 is a schematic diagram of a process flow illustrating communications to manage an invalid routing table entry 172, in accordance with some embodiments of the present disclosure. A description of elements of FIG. 3 that have been described with respect to the prior figures will be omitted for brevity.

Referring to FIGS. 1 and 3, an example is shown in which a container application 118 transmits an I/O request 165 to the lightweight driver 160 at operation 300. In response to the I/O request 165, the lightweight driver 160 may map a virtual storage address 167 of the I/O request 165 to a destination storage address 177 and create a first modified I/O request 165', as described herein with respect to FIGS. 1 and 2. The first modified I/O request 165' may be transmitted to a first storage device 155A, which may be a storage device 155 identified by the destination storage address 177 determined from the routing table 170.

In response to the first modified I/O request 165', the first storage device 155A may determine that the mapping and/or routing of the first modified I/O request 165' may be incorrect. For example, the destination storage address 177 of the first modified I/O request 165' may refer to a storage location that is no longer managed and/or maintained by the first storage device 155A. Such a situation can happen, for example, if the storage system 150 has reallocated data from the first storage device 155A to a second storage device 155B.

In response to the invalid first modified I/O request 165', the first storage device 155A may, in an operation 305 update the first modified I/O request 165' to create a second modified I/O request 165". The second modified I/O request 165" may differ from the first modified I/O request 165' in that the destination storage address 177 may be corrected based on a configuration of the storage system 150. As described herein, in some embodiments, each of the storage devices 155 of the storage system 150 may maintain a current copy of the storage configuration. As a result, the first storage device 155A may be able to correct the invalid destination storage address 177 of the first modified I/O request 165' to generate the second modified I/O request 165". The first storage device 155A may transmit the second modified I/O request 165" to the correct destination (in this example, the second storage device 155B).

In response to the second modified I/O request 165", the second storage device 155B may access the data (e.g., perform a read and/or a write of the data associated with the destination storage address 177) on a block device 156 of the second storage device 155B, and may provide an I/O response 310 to the first storage device 155A in response to the second modified I/O request 165".

The first storage device 155A may provide the I/O response to the lightweight driver 160 in transmission 315. In the same or different transmission, the first storage device 155A may indicate to the lightweight driver 160 that its routing table 170 is stale. The lightweight driver 160 may provide the I/O response 320 to the calling application 118. In addition, the lightweight driver 160 may transmit a routing table request 168 to the first storage device 155A (or any other active storage device 155 of the storage system 150) and receive a routing table update 158 responsive thereto.

The embodiment of FIG. 3 illustrates an example in which a response to the I/O request 165 from the container application 118 may be processed in an expedited manner while still maintaining the routing table 170. In the example of FIG. 3, the first storage device 155A performs the operations to complete the data access without failing the modified I/O request 165' of the lightweight driver 160. In this way, the lightweight driver 160 can perform the update of its routing table 170 after the I/O response 320 has been provided to the application 118, reducing any impact that the update to the routing table 170 might have on the I/O operation.

Though FIG. 3 illustrates that the first storage device 155A receives the I/O response 310 from the second storage device 155B and then passes this on to the lightweight driver 160, the embodiments of the present disclosure are not limited to such a configuration. In some embodiments, the recipient of the second modified I/O request 165" may communicate directly with the lightweight driver 160. In the example of FIG. 3, for instance, the second storage device 155B might provide the I/O response 310 directly to the lightweight driver 160, along with an indication that the routing table 170 utilized by the lightweight driver 160 is stale.

FIG. 4 is a flow diagram of a method 400 for operating a lightweight driver, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120 illustrated in FIG. 1).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIGS. 1 to 3 as well, the method 400 begins at block 410, which includes requesting, by a processing device of a computing device, a routing table from a storage device operatively coupled to the computing device, the routing table comprising a routing table entry mapping a virtual storage address to a destination storage address of the storage device. In some embodiments, the routing table and routing table entry may be similar to the routing table 170 and routing table entry 172, respectively described herein with respect to FIGS. 1 to 3. In some embodiments, the virtual storage address and the destination storage address may be similar to the virtual storage address 167 and the destination storage address 177, respectively described herein with respect to FIGS. 1 to 3. In some embodiments, the computing device may be similar to the computing device 120 described herein with respect to FIGS. 1 to 3. In some embodiments, the storage device may be similar to the storage device 155 and/or the storage system 150 described herein with respect to FIGS. 1 to 3.

In some embodiments, the requesting, by the processing device of the computing device, the routing table from the storage device connected to the computing device may be performed by a driver within a kernel space of an operating system (e.g., operating system 115 of FIG. 1) of the computing device. In some embodiments, the application executing on the computing device comprises a containerized application executing within a container in a user space of the operating system.

At block 420, the method 400 may include receiving an I/O request from an application executing on the computing device, the I/O request comprising the virtual storage address. In some embodiments, the I/O request may be similar to the I/O request 165 described herein with respect to FIGS. 1 to 3. In some embodiments, the application may be similar to the container application 118 and/or the process 112 described herein with respect to FIGS. 1 to 3.

At block 430, the method 400 may include transmitting a modified I/O request to the storage device based on the mapping of the routing table entry. In some embodiments, the modified I/O request may be similar to the modified I/O request 165' described herein with respect to FIGS. 1 to 3.

In some embodiments, the method 400 further includes receiving an I/O response and an indication of an invalid route in response to the modified I/O request, transmitting the I/O response to the application executing on the computing device, transmitting a request for an updated routing table to the storage device, receiving a routing table update from the storage device, and updating the routing table based on the routing table update. In some embodiments, the request for the updated routing table may be similar to the routing table request 168 described herein with respect to FIGS. 1 to 3. In some embodiments, the routing table update may be similar to the routing table update 158 described herein with respect to FIGS. 1 to 3.

In some embodiments, the storage device is a first storage device, the routing table entry is a first routing table entry, and the destination storage address is a first destination storage address. The method 400 may further include receiving an error response to the modified I/O request, transmitting a request for an updated routing table to the first storage device, and receiving a routing table update from the first storage device, the routing table update comprising a second routing table entry mapping the virtual storage address to a second destination storage address of a second storage device. In some embodiments, the request for the updated routing table may be similar to the routing table request 168 described herein with respect to FIGS. 1 to 3. In some embodiments, the routing table update may be similar to the routing table update 158 described herein with respect to FIGS. 1 to 3. In some embodiments, the error response may be similar to the invalid route transmission 205 and/or the invalid route transmission 315 described herein with respect to FIGS. 2 and 3. In some embodiments, the method 400 may further include retransmitting the modified I/O request to the second storage device based on the mapping of the second routing table entry.

In some embodiments, the storage device is a first storage device, the routing table entry is a first routing table entry, and the destination storage address is a first destination storage address. The method 400 may further include determining that the first storage device is no longer available, transmitting a request for an updated routing table to a second storage device, and receiving a routing table update from the second storage device, the routing table update comprising a second routing table entry mapping the virtual storage address to a second destination storage address of the second storage device. In some embodiments, the request for the updated routing table may be similar to the routing table request 168 described herein with respect to FIGS. 1 to 3. In some embodiments, the routing table update may be similar to the routing table update 158 described herein with respect to FIGS. 1 to 3. In some embodiments, determining that the first storage device is no longer available may include operations similar to those described herein with respect to FIG. 3.

FIG. 5 is a schematic block diagram illustrating an example embodiment of a computer system 500 for operating a lightweight driver 160, in accordance with some embodiments of the present disclosure. A description of elements of FIG. 5 that have previously described has been omitted for brevity.

Referring to FIG. 5, computer system 500 may include computing device 120, including memory 124 and processing device 122, as described herein with respect to FIGS. 1 to 4. The processing device 122 may execute instruction code (e.g., as accessed from memory 124), portions of which are illustrated in FIG. 5.

As illustrated in FIG. 5, the computing device 120 (e.g., computing device 120 as described herein with respect to FIGS. 1 to 4) may execute a lightweight driver 160 and an application 518. In some embodiments, the lightweight driver 160 may be similar to the lightweight driver 160 described herein with respect to FIGS. 1 to 4. The application 518 may be similar to the application 118 and/or the process 112 described herein with respect to FIGS. 1 to 4. In some embodiments, the lightweight driver 160 may execute within a kernel space of an operating system (e.g., kernel space 130 of operating system 115 described herein with respect to FIG. 1) and the application 518 may execute within a user space of an operating system (e.g., user space 135 of operating system 115 described herein with respect to FIG. 1).

The computer system 500 may further include a storage device 555. The storage device 555 may be similar to the storage device 155 and/or the storage system 150 described herein with respect to FIGS. 1 to 4. The storage device 555 may be operatively coupled to the computing device 120.

The lightweight driver 160 of the computing device 120 may request (e.g., by processing device 122) a routing table 570 from the storage device 555. The routing table 570 may include a routing table entry 572. The routing table 570 may be similar to routing table 170 described herein with respect to FIGS. 1 to 4. The routing table entry 572 may be similar to routing table entry 172 described herein with respect to FIGS. 1 to 4. The routing table entry 572 may map a virtual storage address 567 to a destination storage address 577 of the storage device 555. The virtual storage address 567 and the destination storage address 577 may be similar to the virtual storage address 167 and the destination storage address 177, respectively, described herein with respect to FIGS. 1 to 4.

In some embodiments, the lightweight driver 160 may receive I/O request 565 from the application 518 executing on the computing device 120. The I/O request 565 may be similar to I/O request 165 described herein with respect to FIGS. 1 to 4. The I/O request 565 may include the virtual storage address 567.

In some embodiments, the lightweight driver 160 may transmit a modified I/O request 565' to the storage device 555 based on the mapping of the routing table entry 572. In some embodiments, the modified I/O request 565' may be similar to the modified I/O request 565' described herein with respect to FIGS. 1 to 4.

The computer system 500 of FIG. 5 provides the technological improvement to dynamically route I/O requests to a storage device from a lightweight kernel driver, while minimizing and/or reducing an impact to the lightweight kernel driver that may be caused by changes to the storage routing algorithms of the storage device. The lightweight kernel driver may be capable of mapping virtual storage addresses received from applications executing in user space into complex storage algorithms that may be supported by an underlying storage device, without having to be aware of (or calculate) the routes. Thus, the complexity of the storage routing algorithm may be maintained at the storage device, and the lightweight kernel driver may be relatively easy to maintain and support. In addition, the use of the lightweight device driver may reduce a number of operations that are utilized to route a storage request by avoiding and/or reduce a transmission to a gateway device to route an I/O request to a final destination. In addition, the use of the lightweight kernel driver may avoid the use of user space libraries/programs to perform storage routing. This may benefit container applications which would otherwise have to include (and maintain) such libraries/programs within the container image. The computer system 500 provides technological improvements to conventional devices in that it provides an ability to accurately route storage requests while reducing an impact of such storage requests on kernel maintenance, while simultaneously improving performance over gateway-based system. Thus, the computer system 500 may be capable of performing additional functionality not capable in conventional computer systems.

Figure 6:
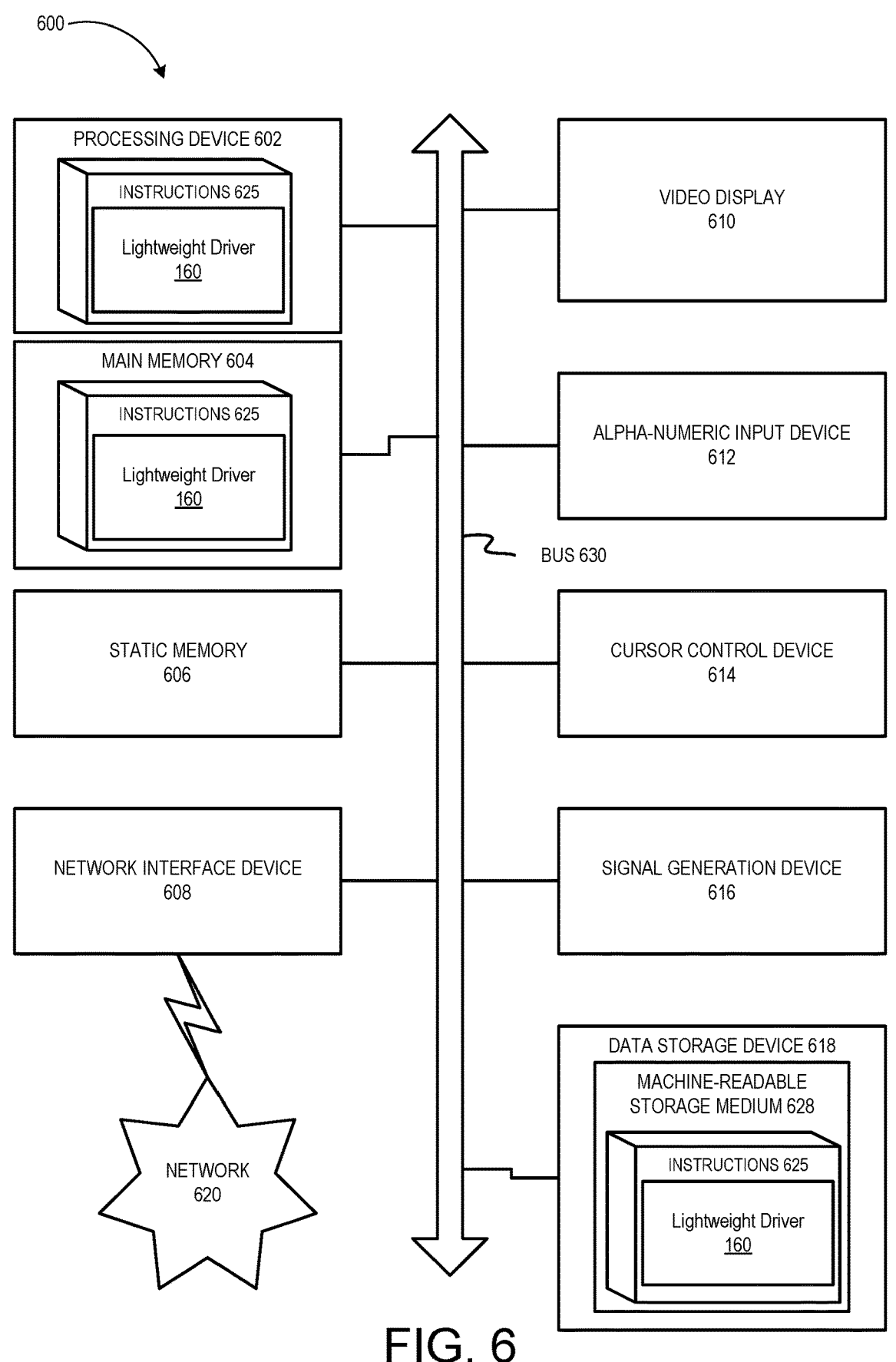
FIG. 6 is a block diagram of an example computing device that may perform one or more of the operations described herein, in accordance with some embodiments of the disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general-purpose processor, a PLD, etc.) 602, a main memory 604 (e.g., synchronous dynamic random-access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a managing I/O requests, e.g., lightweight driver 160, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "requesting," "receiving," "transmitting," "retransmitting," "determining," "executing," "updating" or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

requesting, by a driver within a kernel space of an operating system (OS) of a computing device, a routing table from a storage system comprising a plurality of storage devices, the routing table comprising a routing table entry mapping a virtual storage address to a destination storage address of a storage device in the plurality of storage devices;

receiving, by the driver within the kernel space of the OS, the routing table from the storage device responsive to requesting the routing table;

receiving an input/output (I/O) request from an application executing within a user space of the OS, the I/O request comprising the virtual storage address;

generating, by the driver within the kernel space of the OS, a modified I/O request including the destination storage address based on the routing table entry mapping the virtual storage address to the destination storage address; and transmitting, by the driver within the kernel space of the OS, the modified I/O request to the storage device of the storage system based on the destination storage address included in the modified I/O request.

2. The method of claim 1, wherein the storage device is a first storage device, the routing table entry is a first routing table entry, and the destination storage address is a first destination storage address, and wherein the method further comprises:

receiving an error response to the modified I/O request;

transmitting a request for an updated routing table to the first storage device; and receiving a routing table update from the first storage device, the routing table update comprising a second routing table entry mapping the virtual storage address to a second destination storage address of a second storage device.

3. The method of claim 2, further comprising:

retransmitting the modified I/O request to the second storage device based on the mapping of the second routing table entry.

4. The method of claim 1, wherein the storage device is a first storage device, the routing table entry is a first routing table entry, and the destination storage address is a first destination storage address, and wherein the method further comprises:

determining that the first storage device is no longer available;

transmitting a request for an updated routing table to a second storage device; and receiving a routing table update from the second storage device, the routing table update comprising a second routing table entry mapping the virtual storage address to a second destination storage address of the second storage device.

5. The method of claim 1, wherein the routing table is a copy of a second routing table maintained by the storage system.

6. The method of claim 1, wherein the application comprises a containerized application executing within a container in the user space of the OS.

7. The method of claim 1, wherein the method further comprises:

receiving an I/O response and an indication of an invalid route in response to the modified I/O request;

transmitting the I/O response to the application executing on the computing device;

transmitting a request for an updated routing table to the storage device;

receiving a routing table update from the storage device; and updating the routing table based on the routing table update.

8. A computing device comprising:

a memory; and a processing device, operatively coupled to the memory, to:

request, by a driver within a kernel space of an operating system (OS) of the computing device, a routing table from a storage system comprising a plurality of storage devices, the routing table comprising a routing table entry mapping a virtual storage address to a destination storage address of a storage device in the plurality of storage devices;

receive, by the driver within the kernel space of the OS, the routing table from the storage device responsive to requesting the routing table;

receive an input/output (I/O) request from an application within a user space of the OS, the I/O request comprising the virtual storage address;

generate, by the driver within the kernel space of the OS, a modified I/O request including the destination storage address based on the routing table entry mapping the virtual storage address to the destination storage address; and transmit, by the driver within the kernel space of the OS, the modified I/O request to the storage device of the storage system based on the destination storage address included in the modified I/O request.

9. The computing device of claim 8, wherein the storage device is a first storage device, the routing table entry is a first routing table entry, and the destination storage address is a first destination storage address, and wherein the processing device is further to:

receive an error response to the modified I/O request;

transmit a request for an updated routing table to the first storage device; and receive a routing table update from the first storage device, the routing table update comprising a second routing table entry mapping the virtual storage address to a second destination storage address of a second storage device.

10. The computing device of claim 9, wherein the processing device is further to:

retransmit the modified I/O request to the second storage device based on the mapping of the second routing table entry.

11. The computing device of claim 8, wherein the storage device is a first storage device, the routing table entry is a first routing table entry, and the destination storage address is a first destination storage address, and wherein the processing device is further to:

determine that the first storage device is no longer available;

transmit a request for an updated routing table to a second storage device; and receive a routing table update from the second storage device, the routing table update comprising a second routing table entry mapping the virtual storage address to a second destination storage address of the second storage device.

12. The computing device of claim 8, wherein the routing table is a copy of a second routing table maintained by the storage system.

13. The computing device of claim 8, wherein the application comprises a containerized application executing within a container in the user space of the OS.

14. The computing device of claim 8, wherein the processing device is further to:

receive an I/O response and an indication of an invalid route in response to the modified I/O request;

transmit the I/O response to the application executing on the computing device;

transmit a request for an updated routing table to the storage device;

receive a routing table update from the storage device; and update the routing table based on the routing table update.

15. A non-transitory computer-readable storage medium including instructions that, when executed by a processing device of a computing device, cause the processing device to:

request, by a driver within a kernel space of an operating system (OS), a routing table from a storage system comprising a plurality of storage devices, the routing table comprising a routing table entry mapping a virtual storage address to a destination storage address of a storage device in the plurality of storage devices;

receive, by the driver within the kernel space of the OS, the routing table from the storage device responsive to requesting the routing table;

receive an input/output (I/O) request from an application executing within a user space of the OS, the I/O request comprising the virtual storage address;

generate, by the driver within the kernel space of the OS, a modified I/O request including the destination storage address based on the routing table entry mapping the virtual storage address to the destination storage address; and transmit, by the driver within the kernel space of the OS, the modified I/O request to the storage device of the storage system based on the destination storage address included in the modified I/O request.

16. The non-transitory computer-readable storage medium of claim 15, wherein the storage device is a first storage device, the routing table entry is a first routing table entry, and the destination storage address is a first destination storage address, and wherein the instructions, when executed by the processing device, cause the processing device further to:

receive an error response to the modified I/O request;

transmit a request for an updated routing table to the first storage device; and receive a routing table update from the first storage device, the routing table update comprising a second routing table entry mapping the virtual storage address to a second destination storage address of a second storage device.

17. The non-transitory computer-readable storage medium of claim 16, wherein the instructions, when executed by the processing device, cause the processing device further to:

retransmit the modified I/O request to the second storage device based on the mapping of the second routing table entry.

18. The non-transitory computer-readable storage medium of claim 15, wherein the storage device is a first storage device, the routing table entry is a first routing table entry, and the destination storage address is a first destination storage address, and wherein the instructions, when executed by the processing device, cause the processing device further to:

determine that the first storage device is no longer available;

transmit a request for an updated routing table to a second storage device; and receive a routing table update from the second storage device, the routing table update comprising a second routing table entry mapping the virtual storage address to a second destination storage address of the second storage device.

19. The non-transitory computer-readable storage medium of claim 15, wherein the application comprises a containerized application executing within a container in the user space of the OS.

20. The non-transitory computer-readable storage medium of claim 15, wherein the instructions, when executed by the processing device, cause the processing device further to:

receive an I/O response and an indication of an invalid route in response to the modified I/O request;

transmit the I/O response to the application executing on the computing device;

transmit a request for an updated routing table to the storage device;

receive a routing table update from the storage device; and update the routing table based on the routing table update.

* * * * *